(12) United States Patent
Shinomiya et al.

(10) Patent No.: US 9,410,983 B2
(45) Date of Patent: Aug. 9, 2016

(54) SCANNING PROBE MICROSCOPE

(71) Applicant: KABUSHIKI KAISHA TOSHIBA, Tokyo (JP)

(72) Inventors: Hideo Shinomiya, Mie (JP); Jun Hirota, Kanagawa (JP); Kazunori Harada, Kanagawa (JP); Moto Yabuki, Mie (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/194,465

(22) Filed: Feb. 28, 2014

(65) Prior Publication Data
US 2015/0059025 A1    Feb. 26, 2015

(30) Foreign Application Priority Data

Aug. 22, 2013   (JP) ................. 2013-172391

(51) Int. Cl.
*G01Q 10/00*   (2010.01)
*G01Q 10/06*   (2010.01)
*G01Q 60/30*   (2010.01)

(52) U.S. Cl.
CPC ............... *G01Q 10/06* (2013.01); *G01Q 60/30* (2013.01)

(58) Field of Classification Search
USPC ........................... 850/1; 73/105; 977/851, 852
See application file for complete search history.

(56) References Cited

U.S. PATENT DOCUMENTS

| 7,178,387 | B1 * | 2/2007 | Kley ........... | B82Y 35/00 73/105 |
| 7,406,859 | B2 * | 8/2008 | Xi ............. | B82B 3/00 73/105 |
| 2009/0313730 | A1 * | 12/2009 | Hantschel ..... | B82Y 35/00 850/40 |
| 2011/0235029 | A1 * | 9/2011 | Kaneko ........ | G01N 23/201 356/237.2 |

FOREIGN PATENT DOCUMENTS

| JP | H07-248331 A | 9/1995 |
| JP | H08094643 A | 4/1996 |
| JP | H09171027 A | 6/1997 |
| JP | 2002-054921 A | 2/2002 |
| JP | 2005-195545 A | 7/2005 |

OTHER PUBLICATIONS

Japanese Office Action dated Jan. 8, 2016, filed in Japanese counterpart Application No. 2013-172391, 12 pages (with translation).

* cited by examiner

*Primary Examiner* — Phillip A Johnston
*Assistant Examiner* — Hsien Tsai
(74) *Attorney, Agent, or Firm* — Patterson & Sheridan, LLP

(57) ABSTRACT

A scanning probe microscope includes a stage on which a sample is mounted, a probe configured to measure a characteristic of the sample, and a controller configured to move the probe and the stage relative to each other along a scanning trajectory during measurement of the characteristic of the sample. The scanning trajectory includes a plurality of linear segments, wherein each pair of adjacent linear segments form an angle that is 90 degrees or less.

11 Claims, 8 Drawing Sheets

SCANNING PROBE MICROSCOPE

CROSS-REFERENCE TO RELATED APPLICATION

This application is based upon and claims the benefit of priority from Japanese Patent Application No. 2013-172391, filed Aug. 22, 2013, the entire contents of which are incorporated herein by reference.

FIELD

Embodiments described herein relate generally to a scanning probe microscope.

BACKGROUND

In the related art, scanning probe microscopes (SPMs) have been used for measuring a characteristic of a sample while scanning the sample in a state where a fine probe (a short needle) is in contact with the front surface of the sample. Examples of these scanning probe microscopes include scanning spread resistance microscopes (SSRMs) and the like, which are used to measure the carrier concentration distribution of a transistor.

In the scanning probe microscopes according to the related art, if a contact type probe scans the front surface of a sample, the sample and the tip of the probe wear down, thereby generating abrasion powder. The abrasion powder may stick between the probe and the sample to possibly cause a bad electric connection between the probe and the sample and deteriorate the accuracy of measurement by the probe.

Also, the deterioration of the measurement accuracy may be aggravated by the scanning trajectory of the probe. The scanning trajectory of the probe of the scanning probe microscope according to the related art includes a measurement trajectory along which the probe measures the characteristic of a sample while scanning the front surface of the sample, and a non-measurement trajectory along which the probe does not measure the characteristic of the sample although the front surface of the sample is still scanned. Examples of the non-measurement trajectory include a scanning trajectory that is formed when the probe moves between a plurality of measurement trajectories, and a scanning trajectory that is formed when the probe moves from a point on the front surface of the sample with which the probe comes into contact for the first time, up to a point on the front surface of the sample from which the probe starts to measure the sample. Although not contributing to measurement on the sample, the non-measurement trajectory generates abrasion powder, and thus aggravates deterioration of the measurement accuracy due to abrasion powder.

DETAILED DESCRIPTION

Embodiments provide a scanning probe microscope capable of suppressing deterioration of measurement accuracy due to abrasion powder.

In general, according to one embodiment, a scanning probe microscope includes a stage on which a sample is mounted, a probe configured to measure a characteristic of the sample, and a controller configured to move the probe and the stage relative to each other along a scanning trajectory during measurement of the characteristic of the sample. The scanning trajectory includes a plurality of linear segments, wherein each pair of adjacent linear segments form an angle that is 90 degrees or less.

Hereinafter, scanning probe microscopes according to embodiments of the present exemplary embodiment will be described with reference to the accompanying drawings.

First Embodiment

Figure 1:
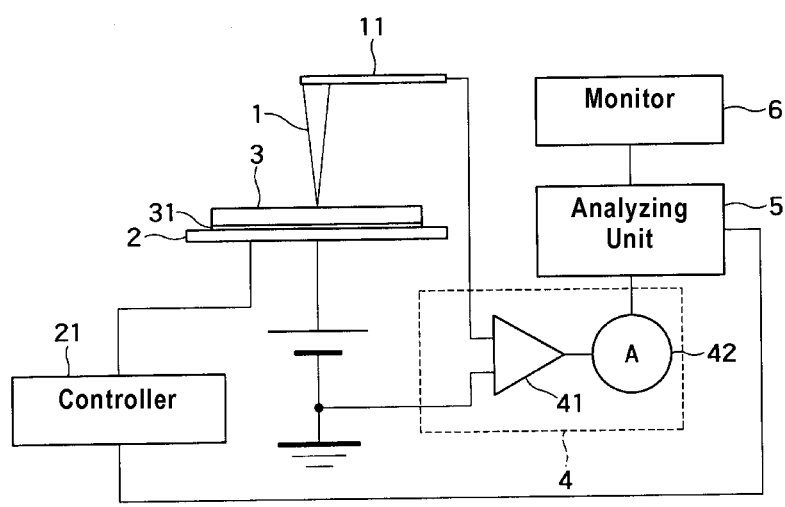
FIG. 1 is a schematic configuration diagram illustrating a scanning probe microscope according to embodiments.

FIG. 1 is a schematic diagram illustrating a scanning probe microscope according to an embodiment of the present disclosure. This scanning probe microscope measures the resistance value of a sample 3 while scanning a scan area 32 (shown in FIG. 2) of the front surface of the sample 3 in a state where a probe 1 is in contact with the scan area 32, and outputs an analysis result based on the measured result. This scanning probe microscope may measure characteristics such as electric characteristics and a front surface shape other than the resistance value of the sample 3. The scanning probe microscope includes the probe 1 for scanning the scan area 32 of the front surface of the sample 3, a stage 2 for mounting the sample 3, a measuring circuit 4 for measuring a current flowing in the sample 3 (or a voltage), an analyzing unit 5 for analyzing the measured value of the current (or the voltage) measured by the measuring circuit 4, thereby obtaining the resistance value, and a monitor 6 for displaying the analysis result of the analyzing unit 5.

The probe 1 is formed of a conductive material, and is pressed against the front surface of the sample 3 by a cantilever 11. As the probe 1, for example, a diamond probe can be used. The diameter of the tip of the probe 1 which comes into contact with the sample 3 is, for example, 25 nm to 50 nm; however, it is not limited thereto.

The stage 2 is controlled by a controller 21, and moves the sample 3, mounted (fixed) on its front surface, in X axis, Y axis, and Z axis directions. As the stage 2, for example, a piezo-stage can be used. The stage 2 moves the sample 3 with respect to the fixed probe 1, whereby the probe 1 can scan the front surface of the sample 3.

On the front surface of the sample 3, the scan area 32 to be scanned by the probe 1 is set, and the tip of the probe 1 comes into contact with the scan area 32. On the back surface of the sample 3, a back surface electrode 31 is provided. The back surface electrode 31 of the sample 3 and the probe 1 are connected to the measuring circuit 4.

The measuring circuit 4 applies a bias voltage between the back surface electrode 31 of the sample 3 and the probe 1, and measures the current value of a current flowing at that time.

The measuring circuit 4 includes an amplifier 41 for amplifying the current, and an ammeter 42 for measuring the current value. Also, the measuring circuit 4 may include a constant current source, and measure a potential difference which is generated when a constant current flows between the back surface electrode 31 of the sample 3 and the probe 1. In this case, the measuring circuit 4 includes an amplifier 41 and a voltmeter for measuring a voltage value. The current value measured by the measuring circuit 4 is input to the analyzing unit 5.

The analyzing unit 5 calculates the resistance value of the sample 3 on the basis of the current value received from the measuring circuit 4, and the voltage applied to the sample 3. The analyzing unit 5 stores calculated resistance values, information items on coordinates of the scan area 32 of the sample 3 from which the resistance values have been calculated, and an information storage order which is the order in which the information items have been stored. Thereafter, on the basis of the stored resistance values, coordinate information items, information storage order, the analyzing unit 5 rearranges the resistance values. That is, the analyzing unit 5 plots the resistance values at corresponding coordinate positions, thereby constituting image information including the resistance values and the measurement positions of the scan area 32 associated with each other. The analyzing unit 5 outputs the image information to the monitor 6.

On the monitor 6, the image information received from the analyzing unit 5 is displayed. This image information can be displayed as a two-dimensional or three-dimensional map of the scan area 32.

The controller 21 moves the probe 1 and the stage 2 relative to each other, and controls the probe 1 such that the probe 1 scans the front surface of the sample 3. The probe 1 needs only to move relative to the stage 2. Therefore, the controller 21 may move the probe 1, or may move the stage 2 with the probe 1 fixed.

Figure 2:
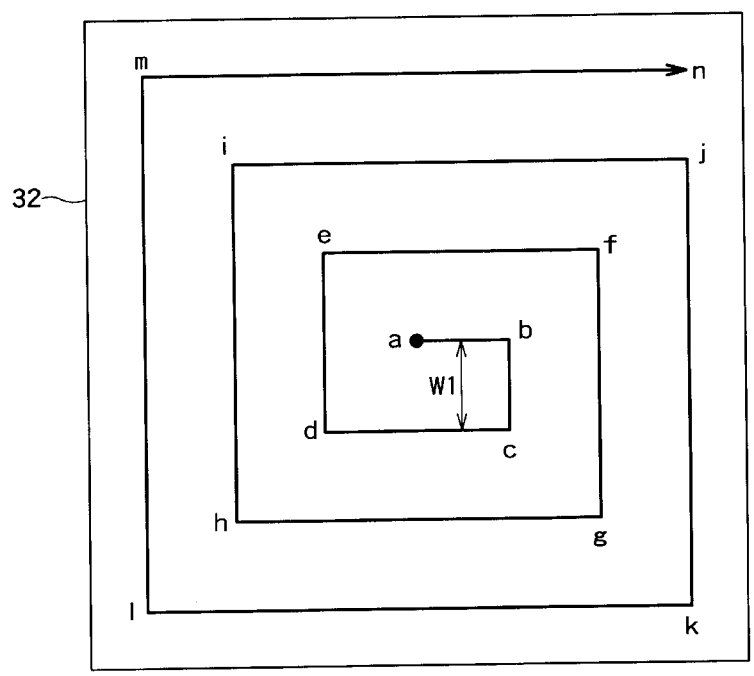
FIG. 2 is a plan view illustrating the measurement trajectory of a scanning probe microscope according to a first embodiment.

Subsequently, the measurement trajectory of the scanning probe microscope of the first embodiment will be described with reference to FIG. 2. FIG. 2 is a plan view illustrating the measurement trajectory of the scanning probe microscope of the first embodiment. In FIG. 2, the scan area 32 of the sample 3 is square. However, the shape of the scan area 32 is not limited thereto. Also, the entire front surface of the sample 3 may be the scan area 32, or only a portion of the front surface of the sample 3 may be the scan area 32. The scan area 32 of the front surface of the sample 3 can be set to have, for example, a square shape having sides each of which is 5 μm or less.

In the measurement process of the first embodiment, the probe 1 is disposed first at a starting point a, which is the central portion of the scan area 32 of the sample 3. A point of the scan area 32 with which the probe 1 comes into contact for the first time is the starting point a, and the measurement trajectory begins from the starting point a. That is, in the present embodiment, the starting point of the measurement trajectory and the starting point of a scanning trajectory coincide with each other. After coming into contact with the starting point a, the probe 1 starts to measure the sample 3.

At the start of the measurement, the probe 1 scans the scan area 32 linearly from the point a up to a point b, thereby forming a measurement trajectory portion ab. At this time, as described above, the probe 1 needs only to move relative to the stage 2. For example, the sample 3 may be moved in the opposite direction to the traveling direction of the probe 1 on the measurement trajectory by the stage 2, with the probe 1 fixed. However, the probe 1 moves in a vertical direction according to convexes and concaves of the front surface of the sample 3. For convenience of explanation, hereinafter, the probe 1 will be described as moving. The probe 1 scrapes the sample 3 in the process of scanning from the point a up to the point b, thereby generating abrasion powder 7 (shown in FIG. 3).

Figure 3:
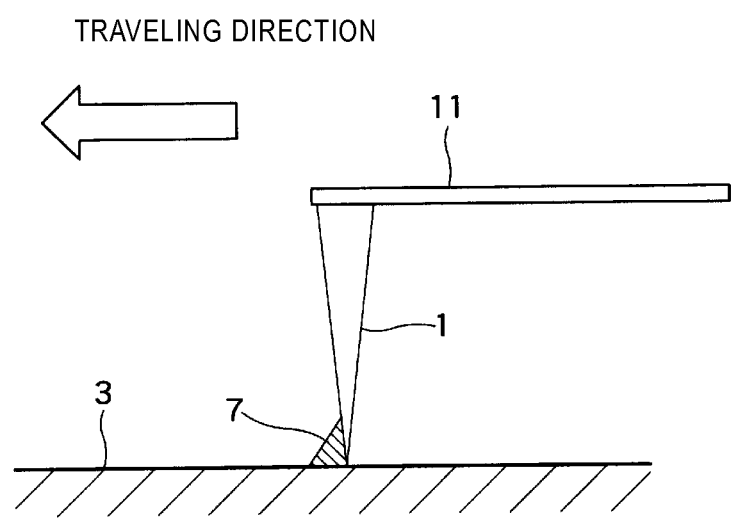
FIG. 3 is an enlarged view of a probe scanning the front surface of a sample.

FIG. 3 is an enlarged view of the probe scanning the front surface of the sample 3. As shown in FIG. 3, abrasion powder 7 is deposited mainly on the traveling direction side of the probe 1. Therefore, on the traveling direction side (point b side) of the probe 1 on the measurement trajectory portion ab of FIG. 2, abrasion powder 7 is deposited. As the distance that the probe 1 linearly moves for scanning increases, more abrasion powder 7 is deposited on the front side of the probe 1.

If the scanning up to the point b finishes, the traveling direction of the probe 1 turns right 90 degrees. The angle of the turn may be arbitrarily set so long as the measurement trajectory portions before and after the turn form 90 degrees or less. In this way, the measurement trajectory is bent at a right angle (or at an acute angle).

Figure 4:
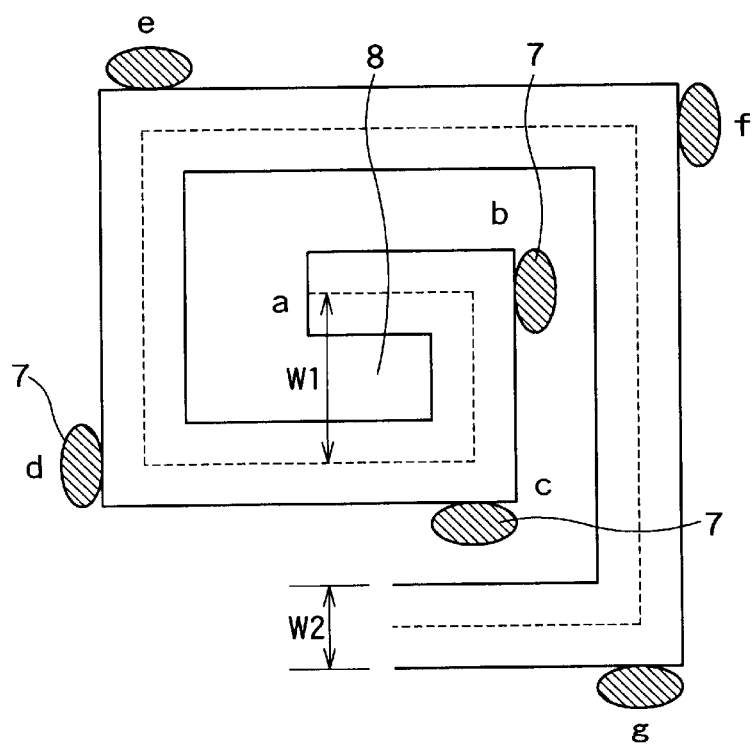
FIG. 4 is a partial enlarged view of FIG. 2.

FIG. 4 is a partial enlarged view of the plan view of FIG. 2. As shown in FIG. 4, if the traveling direction of the probe 1 turns 90 degrees at the point b, the abrasion powder 7 deposited on the traveling direction side (point b side) of the probe 1 is left on the outside of the point b. Therefore, abrasion powder 7 deposited on the probe 1 significantly decreases.

After turning at the point b, the probe 1 performs scanning linearly from the point b up to a point c, thereby forming a measurement trajectory portion bc, and turns right 90 degrees at the point c. Therefore, abrasion powder 7 generated at the measurement trajectory portion bc and deposited on the traveling direction side (point c side) of the probe 1 is left on the outside of the point c.

After turning at the point c, the probe 1 performs scanning linearly from the point c up to a point d, thereby forming a measurement trajectory portion cd longer than the measurement trajectory portion ab. If the scanning up to the point d finishes, the traveling direction of the probe 1 turns right 90 degrees. Therefore, abrasion powder 7 generated at the measurement trajectory portion cd and deposited on the traveling direction side (point d side) of the probe 1 is left on the outside of the point d.

As shown in FIG. 4, a distance W1 between the measurement trajectory portion cd and the measurement trajectory portion ab facing the measurement trajectory portion cd is larger than the width W2 of the scanning trajectory, where the distance W1 means a distance between the center lines of measurement trajectory portions (for example, the scanning trajectory portion ab and the scanning trajectory portion cd) of the measurement trajectory facing each other. In FIG. 4, the center line of the measurement trajectory is shown by a broken line. Since the distance W1 between the measurement trajectory portion cd and the measurement trajectory portion ab is larger than the width W2 of the measurement trajectory, between these two measurement trajectory portions, a non-scan area 8 which is not scanned by the probe 1 is formed. Also, the distance W1 between the measurement trajectory portion cd and the measurement trajectory portion ab is equal to the length of the center line of the measurement trajectory portion bc.

After turning at the point d, the probe 1 performs scanning linearly from the point d up to a point e, thereby forming a measurement trajectory portion de longer than the measurement trajectory portion bc. Since the measurement trajectory portion cd is longer than the measurement trajectory portion ab, the measurement trajectory portion de does not intersect with the measurement trajectory portion ab. If the scanning up to the point e finishes, the traveling direction of the probe 1 turns right 90 degrees. Therefore, abrasion powder 7 generated at the measurement trajectory portion de and deposited on the traveling direction side (point e side) of the probe 1 is left on the outside of the point e.

Thereafter, the probe 1 repeats the same process up to a point n, thereby forming the measurement trajectory. As a result, the measurement trajectory spiral in a clockwise direction from the inner side toward the outer side as shown in FIG. 2, is formed. Alternatively, this measurement trajectory may be formed to be spiral in a counterclockwise direction from the inner side toward the outer side. In this case, the traveling direction of the probe 1 turns left at each of the points b to m.

As described above, the scanning probe microscope according to the first embodiment bends some portions of the measurement trajectory of the probe 1 at a right angle or at an acute angle. Therefore, when the probe 1 turns at each bent portion of the measurement trajectory, abrasion powder 7 deposited on the traveling direction side of the probe 1 is left on the outer side of the measurement trajectory, and thus abrasion powder 7 deposited on the probe 1 decreases. Therefore, abrasion powder 7 is suppressed from getting stuck between the probe 1 and the sample 3, causing a bad electric connection between the probe 1 and the sample 3, resulting in deterioration of the measurement accuracy, and the measurement accuracy is improved. As a result, the scanning probe microscope can secure reproducibility of stable characteristic values and measurement.

Also, the starting point a of the measurement trajectory coincides with the starting point of the scanning trajectory of the probe 1. Therefore, the scanning trajectory of the present embodiment does not include any non-measurement trajectory, and thus it is possible to suppress generation of abrasion powder 7. Here, the non-measurement trajectory is a scanning trajectory which is formed when the probe 1 moves from the point of the surface of the sample 3 with which the probe 1 comes into contact for the first time, up to the point (point a) where the probe 1 starts measurement on the sample 3. Further, since a time to scan the non-measurement trajectory is reduced (or eliminated), it is possible to reduce the scanning time and prevent the probe 1 from wearing down.

Also, the measurement trajectory can be drawn with a single stroke. Therefore, the scanning trajectory of the present embodiment does not include any non-measurement trajectory, and thus it is possible to suppress generation of abrasion powder 7. Here, the non-measurement trajectory means a scanning trajectory which is formed when the probe 1 moves between a plurality of measurement trajectory portions. Further, since a time to scan the non-measurement trajectory is reduced (or eliminated), it is possible to reduce the scanning time and prevent the probe 1 from wearing down.

Also, the measurement trajectory portions do not intersect with each other. Therefore, the probe 1 does not pass through a measurement trajectory portion where abrasion powder 7 has been already deposited due to scanning of the probe, and thus it is possible to suppress deposition of abrasion powder 7 onto the probe 1.

Also, the distance W1 between the measurement trajectory portions is larger than the width W2 of the measurement trajectory. Therefore, between measurement trajectory portions facing each other, the non-scan area 8 is formed. Since abrasion powder 7 is left in the non-scan area 8 when the probe 1 turns, it is possible to prevent the left abrasion powder 7 from being re-deposited on the probe 1.

Also, the measurement trajectory is spiral from the inner side toward the outer side. Since the measurement trajectory has a simple shape, the analyzing unit 5 can plot the resistance value of each point on the measurement trajectory at the corresponding point on the basis of the coordinate information items and the information storage order, thereby easily compiling the image information. That is, the analyzing unit 5 can easily rearrange the resistance values on the basis of the coordinate information items and the information storage order, and output the rearranged resistance values as the image information.

Also, the point a of the measurement trajectory is the central portion of the scan area 32 of the sample 3. Therefore, it is possible to easily scan the entire surface of the scan area 32 of the sample 3 along the measurement trajectory spiral from the inner side toward the outer side.

Second Embodiment

Subsequently, a scanning probe microscope according to a second embodiment of the present disclosure will be described. The configuration of the scanning probe microscope is the same as that of the first embodiment, and thus will not be described, and a scanning trajectory different from that of the first embodiment will be described.

Figure 5:
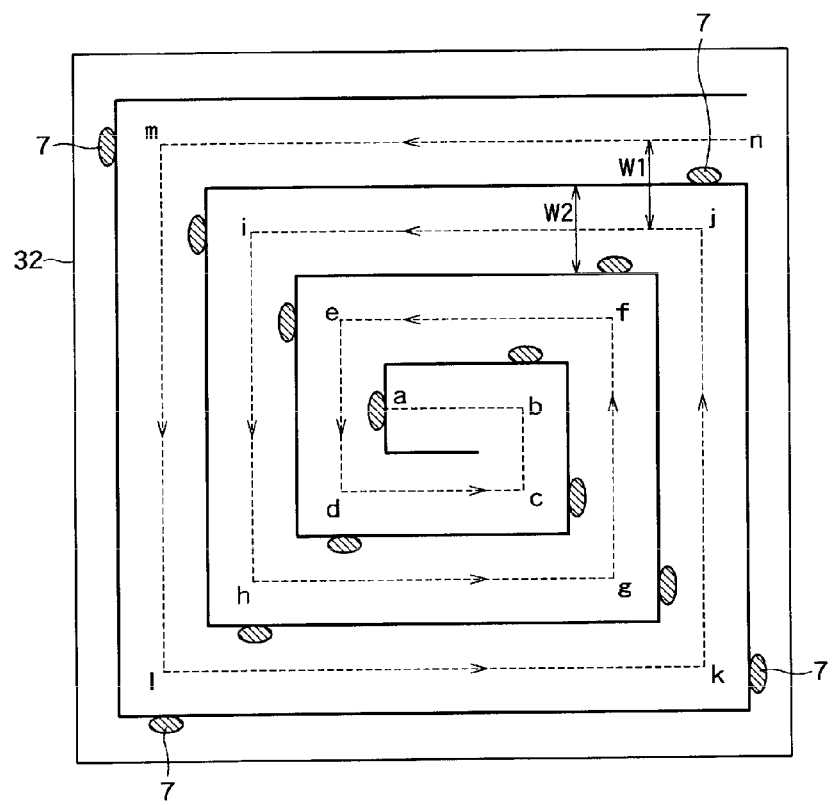
FIG. 5 is a plan view illustrating the measurement trajectory of a scanning probe microscope according to a second embodiment.

FIG. 5 is a plan view illustrating the measurement trajectory of the scanning probe microscope according to the second embodiment. In FIG. 5, the scan area 32 of the sample 3 is square. However, the shape of the scan area 32 is not limited thereto.

On the measurement trajectory of the second embodiment, the probe 1 is disposed first at a starting point n of the outer peripheral portion of the scan area 32 of the sample 3. If coming into contact with the starting point n, the probe 1 starts to measure the sample 3.

If starting measurement, first, the probe 1 scans the scan area 32 linearly from the point n up to a point m, thereby forming a measurement trajectory portion nm. The probe 1 is scraped by the sample 3 or scrapes the sample 3 in the process of scanning from the point n up to the point m, thereby generating abrasion powder 7.

If the scanning up to the point m finishes, the traveling direction of the probe 1 turns left 90 degrees. The angle of the turn may be arbitrarily set as long as measurement trajectory portions which are formed before and after the turn form 90 degrees or less. In this way, the measurement trajectory is bent at a right angle (or at an acute angle).

As shown in FIG. 5, if the traveling direction of the probe 1 turns 90 degrees at the point m, abrasion powder 7 deposited on the traveling direction side (point m side) of the probe 1 is left on the outside of the point m.

After turning at the point m, the probe 1 performs scanning linearly from the point m up to a point l, thereby forming a measurement trajectory portion ml, and turns left 90 degrees at the point l. Therefore, abrasion powder 7 generated at the measurement trajectory portion ml and deposited on the traveling direction side (point l side) of the probe 1 is left on the outside of the point l.

After turning at the point l, the probe 1 performs scanning linearly from the point l up to a point k, thereby forming a measurement trajectory portion lk, and turns left 90 degrees at the point k. Therefore, abrasion powder 7 generated at the measurement trajectory portion lk and deposited on the traveling direction side (point k side) of the probe 1 is left on the outside of the point k.

After turning at the point k, the probe 1 performs scanning linearly from the point k up to a point j, thereby forming a measurement trajectory portion kj. The measurement trajectory portion kj is shorter than the measurement trajectory portion ml, and protrudes toward the point n side such that at least a portion of the measurement trajectory portion kj overlaps the measurement trajectory portion nm. If the scanning up to the point j finishes, the traveling direction of the probe 1 turns left 90 degrees. Therefore, abrasion powder 7 generated at the measurement trajectory portion kj and deposited on the traveling direction side (point j side) of the probe 1 is left on the outside of the point j, that is, on the measurement trajectory portion nm having been already scanned.

After turning at the point j, the probe 1 performs scanning linearly from the point j up to a point i, thereby forming a measurement trajectory portion ji. The measurement trajectory portion ji is shorter than the measurement trajectory portion lk, and protrudes toward the point m side such that at least a portion of the measurement trajectory portion ji overlaps the measurement trajectory portion lk. As shown in FIG. 5, a distance W1 between the measurement trajectory portion ji formed here and the measurement trajectory portion nm adjacent to the measurement trajectory portion ji is equal to or less than the width W2 of the measurement trajectory. Therefore, in the present embodiment, the measurement trajectory portion ji and the measurement trajectory portion nm partially overlap each other such that a non-scan area 8 is not formed therebetween. If the scanning up to the point i finishes, the traveling direction of the probe 1 turns left 90 degrees. Therefore, abrasion powder 7 generated at the measurement trajectory portion ji and deposited on the traveling direction side (point i side) of the probe 1 is left on the outside of the point i, that is, on the measurement trajectory portion ml having been already scanned.

Thereafter, the probe 1 repeats the same process up to a point a, thereby forming the measurement trajectory including no non-scan area 8. As a result, the measurement trajectory spiral in a counterclockwise direction from the outer side toward the inner side as shown in FIG. 5 is formed. Alternatively, this measurement trajectory may be formed to be spiral in a clockwise direction from the outer side toward the inner side. In this case, the traveling direction of the probe 1 turns right at each of the points m to b.

As described above, the scanning probe microscope according to the second embodiment bends some portions of the measurement trajectory of the probe 1 at right angles or at acute angles, similarly in the above described first embodiment, and the starting point n of the measurement trajectory coincides with the starting point of the scanning trajectory of the probe 1. Also, the measurement trajectory portions can be drawn with a single stroke, and do not intersect with each other.

Also, the distance W1 between the measurement trajectory portions is equal to or less than the width W2 of the measurement trajectory. For this reason, between neighboring measurement trajectory portions, a non-scan area 8 is not formed. Therefore, it is possible to scan the scan area 32 of the sample 3 without a break, and to improve the measurement accuracy.

Also, the measurement trajectory is spiral from the outer side toward the inner side. Since the measurement trajectory has a simple shape, the analyzing unit 5 can plot the resistance value of each point on the measurement trajectory at the corresponding point on the basis of coordinate information items and an information storage order, thereby easily compiling the image information. That is, the analyzing unit 5 can easily rearrange the resistance values on the basis of the coordinate information items and the information storage order, and output the rearranged resistance values as the image information. Further, since abrasion powder 7 is left in a measurement trajectory portion having been already scanned when the probe 1 turns, the probe 1 does not rescan the area where the abrasion powder 7 is left. Therefore, it is possible to prevent abrasion powder 7 left during turning of the probe 1 from being re-deposited on the probe 1.

Also, the starting point n of the measurement trajectory is at the outer peripheral portion of the scan area 32 of the sample 3. Therefore, it is possible to easily scan the entire surface of the scan area 32 of the sample 3 along the measurement trajectory spiral from the outer side toward the inner side.

Third Embodiment

Subsequently, a scanning probe microscope according to a third embodiment of the present disclosure will be described. The configuration of the scanning probe microscope is the same as those of the first embodiment and the second embodiment, and thus will not be described, and a scanning trajectory different from those of the first embodiment and the second embodiment will be described.

Figure 6:
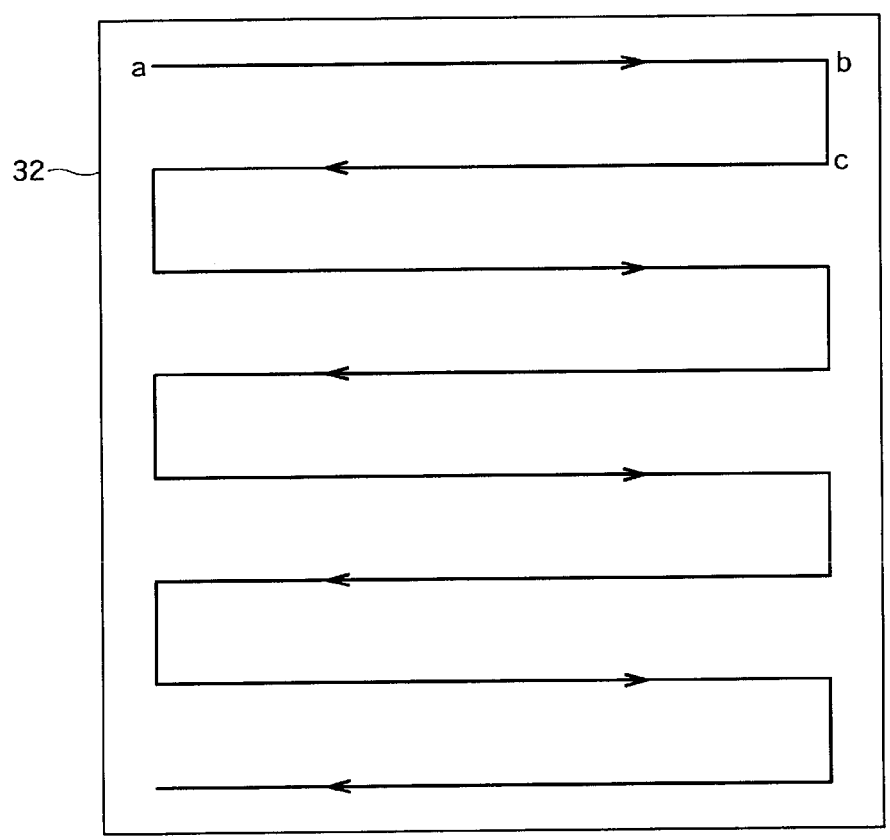
FIG. 6 is a plan view illustrating the measurement trajectory of a scanning probe microscope according to a third embodiment.

FIG. 6 is a plan view illustrating the measurement trajectory of the scanning probe microscope according to the third embodiment. In FIG. 6, the scan area 32 of the sample 3 is square. However, the shape of the scan area 32 is not limited thereto.

On the measurement trajectory of the third embodiment, the probe 1 is disposed first at a starting point a of the outer peripheral portion of the scan area 32 of the sample 3. If coming into contact with the starting point a, the probe 1 starts to measure the sample 3.

If starting measurement, first, the probe 1 scans the scan area 32 linearly from the point a up to a point b, thereby forming a measurement trajectory portion ab. The probe 1 is scraped by the sample 3 or scrapes the sample 3 in the process of scanning from the point a up to the point b, thereby generating abrasion powder 7.

If the scanning up to the point b finishes, the traveling direction of the probe 1 turns right 90 degrees. In this way, the measurement trajectory is bent at a right angle. If the traveling direction of the probe 1 turns 90 degrees at the point b, abrasion powder 7 deposited on the traveling direction side (point b side) of the probe 1 is left on the outside of the point b.

Subsequently, the probe 1 performs scanning linearly from the point b up to a point c, thereby forming a measurement trajectory portion bc, and turns right 90 degrees at the point c. If the probe 1 turns at the point c, abrasion powder 7 deposited on the traveling direction side (point c side) of the probe 1 is left on the outside of the point c.

Thereafter, the probe 1 repeats the same process, thereby forming a wave-like (bellows-like or zig-zag) scanning trajectory including a plurality of linear portions.

As described above, the scanning probe microscope according to the third embodiment bends some portions of the measurement trajectory of the probe 1 at right angles, similarly in the above described first embodiment, and the starting point a of the measurement trajectory coincides with the starting point of the scanning trajectory of the probe 1. Also, the measurement trajectory portions can be drawn with a single stroke, and do not intersect with each other.

Also the measurement trajectory has a wave shape (a bellows shape or a zig-zag shape) including a plurality of linear portions. Since the measurement trajectory has a simple shape, the analyzing unit 5 can plot the resistance value of each point on the measurement trajectory at the corresponding point on the basis of coordinate information items and an information storage order, thereby easily compiling the image information. That is, the analyzing unit 5 can easily rearrange the resistance values on the basis of the coordinate information items and the information storage order, and output the rearranged resistance values as the image information.

Also, the starting point a of the measurement trajectory is at the outer peripheral portion of the scan area 32 of the sample 3. Therefore, it is possible to easily scan the entire surface of the scan area 32 of the sample 3 along the wave-like (bellows-like or zig-zag) scanning trajectory including a plurality of linear portions.

Also, since the length of each linear portion is short, it is possible to reduce abrasion powder 7 to be deposited on the probe 1 during scanning on the corresponding linear portion.

First Modification of Third Embodiment

Figure 7:
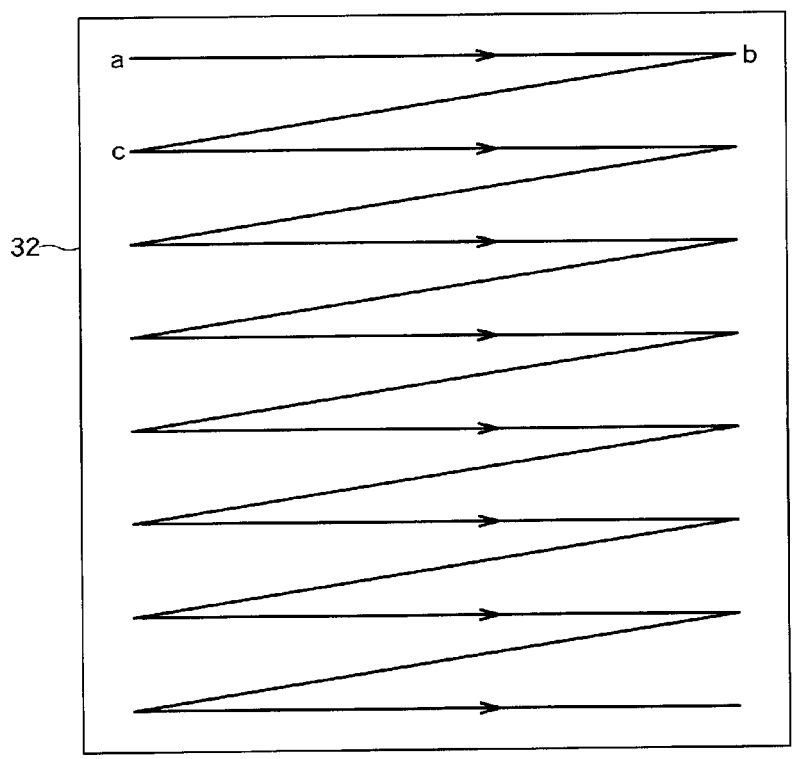
FIG. 7 is a plan view illustrating a modification of the measurement trajectory of FIG. 6.

FIG. 7 is a modification of the measurement trajectory according to the third embodiment. For this measurement trajectory, the probe 1 is disposed first at a starting point a of the outer peripheral portion of the scan area 32 of the sample 3, and scans the scan area 32 linearly from the point a up to a point b, thereby forming a measurement trajectory portion ab.

If the scanning up to the point b finishes, the traveling direction of the probe 1 turns right an angle larger than 90 degrees. As a result, the measurement trajectory is bent at an acute angle. If the traveling direction of the probe 1 turns at the point b, abrasion powder 7 deposited on the traveling direction side (point b side) of the probe 1 is left on the outside of the point b.

Thereafter, the probe 1 repeats the same process, thereby forming a wave-like (bellows-like or zig-zag) measurement trajectory including a plurality of linear portions.

Second Modification of Third Embodiment

Figure 8:
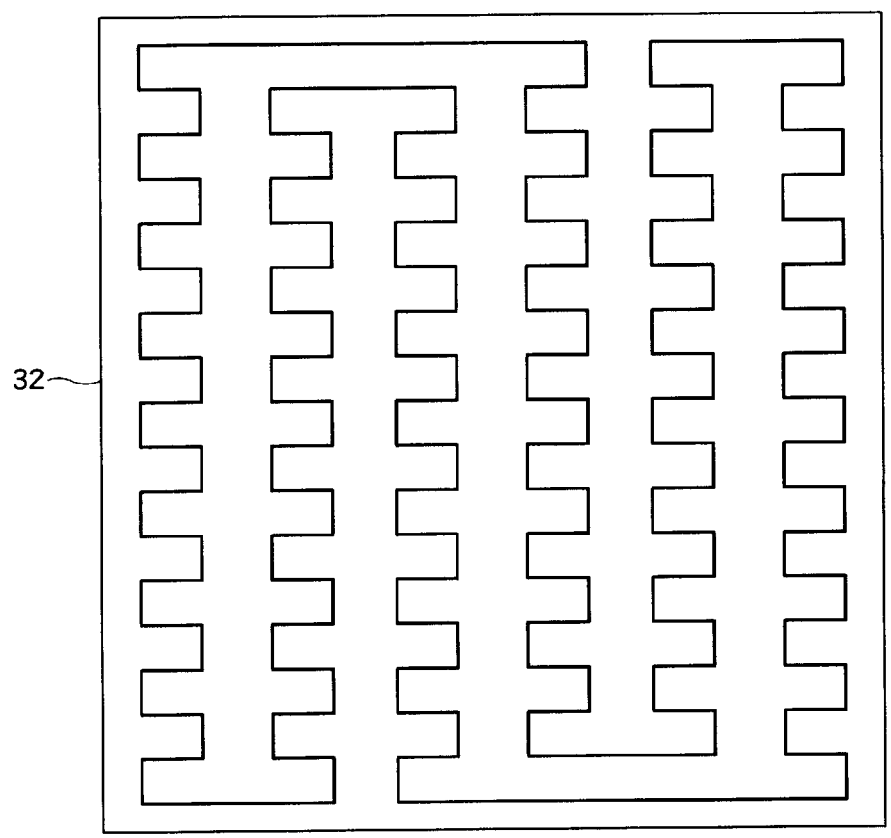
FIG. 8 is a plan view illustrating another modification of the measurement trajectory of FIG. 6.

FIG. 8 is another modification of the measurement trajectory according to the third embodiment. This measurement trajectory is an annular trajectory obtained by connecting the starting point and end point of a wave-like (bellows-like or zig-zag) scanning trajectory including a plurality of linear portions.

According to this configuration, even if scanning starts from an arbitrary point on the measurement trajectory, it is possible to scan the entire surface of the scan area 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A scanning probe microscope comprising:
    a stage on which a sample is mounted;
    a diamond probe in electrical contact with the sample during measurement;
    a measuring unit configured to measure a characteristic of the sample using scanning spread resistance microscopy based on an amount of electrical current flowing through the probe; and
    a controller configured to move at least one of the probe and the stage relative to each other along a scanning trajectory during measurement of the characteristic of the sample, the scanning trajectory including a plurality of linear segments, wherein
    each pair of adjacent linear segments forms an angle that is 90 degrees or less,
    a measurement trajectory coincides with the scanning trajectory and begins at an outer side and ends at an inner side,
    a distance between each adjacent parallel portions of the measurement trajectory is less than a width of the measurement trajectory, and
    said each adjacent parallel portions of the measurement trajectory overlap one another.

2. The scanning probe microscope according to claim 1, wherein
    the measurement trajectory is continuous.

3. The scanning probe microscope according to claim 1, wherein
    the measurement trajectory does not have any portions that intersect.

4. The scanning probe microscope according to claim 1, wherein the measurement trajectory is a closed trajectory.

5. A method of measuring a surface of a sample that is mounted on a stage, comprising:
    moving at least one of a diamond probe and the stage relative to each other along a scanning trajectory, the scanning trajectory including a plurality of linear segments, wherein each pair of adjacent linear segments form an angle that is 90 degrees or less; and
    measuring a characteristic of the surface of the sample while moving at least one of the probe and the stage relative to each other along the scanning trajectory, using scanning spread resistance microscopy based on an amount of electrical current flowing through the probe, wherein
    a measurement trajectory coincides with the scanning trajectory and begins at an outer side and ends at an inner side,
    a distance between each adjacent parallel portions of the measurement trajectory is less than a width of the measurement trajectory, and
    said each adjacent parallel portions of the measurement trajectory overlap one another.

6. The method according to claim 5, wherein
    the measurement trajectory is continuous.

7. The method according to claim 5, wherein
    the measurement trajectory does not have any portions that intersect.

8. The method according to claim 5, wherein
    the measurement trajectory is a closed trajectory.

9. The method according to claim 5, wherein
    said at least one of the diamond probe and the stage is moved, such that abrasion powder of the sample is deposited at an end of each of the linear segments in a scanning direction.

10. The scanning probe microscope according to claim 1, wherein
    no non-scanned region is present between said each adjacent parallel portions of the measurement trajectory.

11. The method according to claim 5, wherein
    no non-scanned region is present between said each adjacent parallel portions of the measurement trajectory.

* * * * *